Figure 1A:
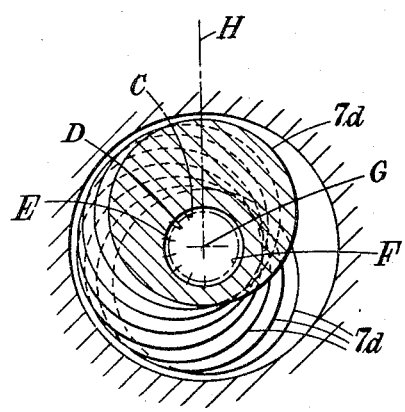

Oct. 25, 1949.  V. ZONA  2,485,854
MIXER FOR PLASTIC MATERIALS
Filed April 10, 1948  3 Sheets-Sheet 1
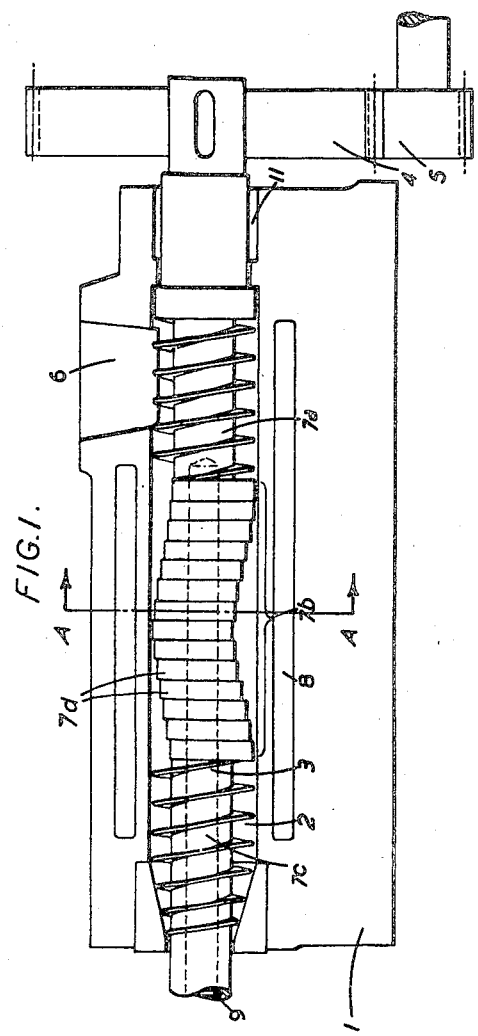
Inventor
VITTORIO ZONA
By
Toulmin + Toulmin
Attorneys Oct. 25, 1949.  V. ZONA  2,485,854
MIXER FOR PLASTIC MATERIALS
Filed April 10, 1948  3 Sheets-Sheet 2

INVENTOR
VITTORIO ZONA
By
Toulmin & Toulmin
ATTORNEYS

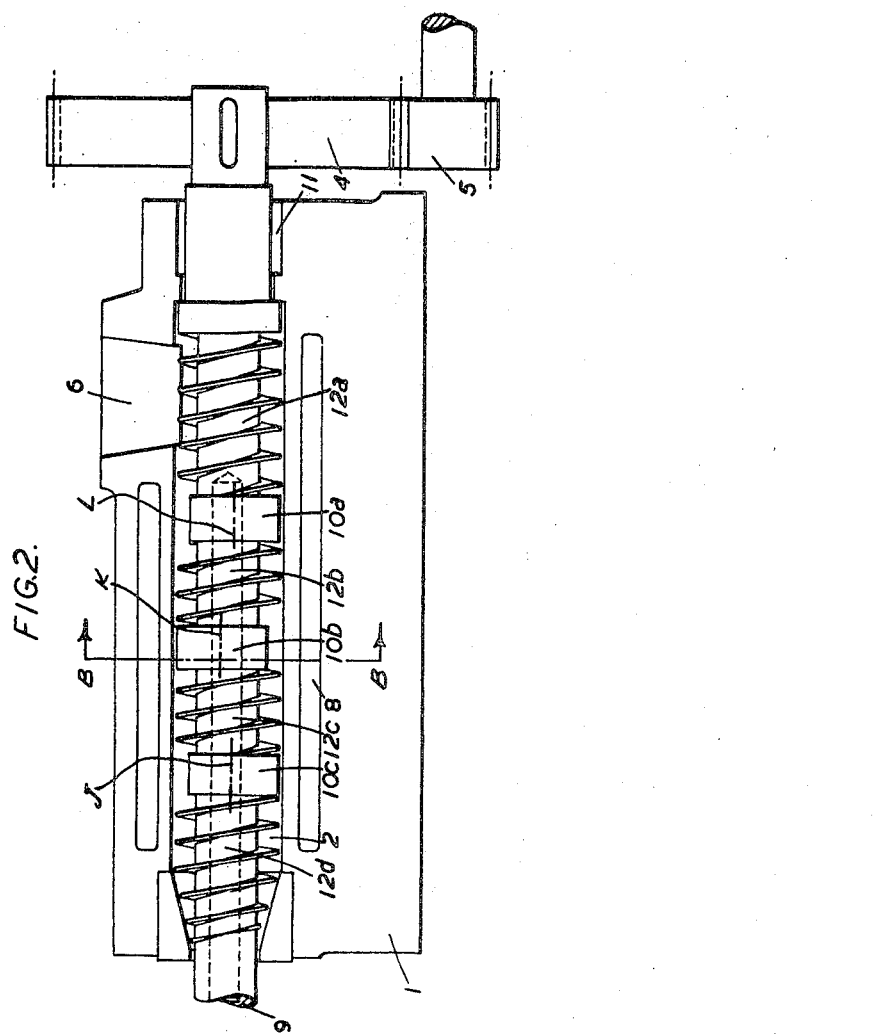

Patented Oct. 25, 1949

2,485,854

UNITED STATES PATENT OFFICE 2,485,854

MIXER FOR PLASTIC MATERIALS

Vittorio Zona, Milan, Italy, assignor to Pirelli Societa Per Azioni, Milan, Italy Application April 10, 1948, Serial No. 20,344

9 Claims. (Cl. 259—9)

This invention relates to machines for admixing the ingredients of compositions having a base of elastic rubber or a like plastic.

As is known, elastic rubber goods and like goods whereof the base of the component composition of the goods is a plastic are obtained by compounding the base with various ingredients, usually vulcanising agents, softening agents, pigmenting agents and fillers.

The compounding operation is usually performed either on an open roller mixer or also on a closed mixer in which two specially shaped rotors mix the materials to be compounded within the interior of a metal walled chamber.

In either case the operation is discontinuous. Thus the rubber or other plastic, and the ingredients to be mixed therewith, is first charged on to the roller of the open roller mixer or, as the case may be, into the metal walled chamber of the closed mixer; the mixer is then set in motion and operated for a sufficient length of time to complete the required compounding of the materials, and finally, upon completion of the compounding, the mixture is removed from the mixer and the operation is repeated upon a fresh batch of the materials.

Such an operation requires the use of skilled workmen and it is, moreover, a heavy and difficult operation.

The object of the present invention is, therefore, to provide an improved construction of mixer for plastic materials which will avoid these disadvantages with the known mixers referred to, the mixer being of the class designed for continuous operation and comprising a tubular mixing chamber of circular cross-section having an inlet at one end and an outlet at the other end, continuously operable means for forcing the materials to be mixed into the mixing chamber by way of the inlet thereof, along the chamber to the outlet thereof and out of the chamber by way of said outlet, and continuously operable means for mechanically admixing the materials with one another as they are forced through the chamber.

According to the invention such a mixer is provided wherein the means for mechanically admixing the materials with one another as they are forced through the chamber is constituted by a rotor disposed coaxially with the mixing chamber and sub-divided as to its peripheral surface, axially of the rotor, into a number of sections each of which is a surface of revolution about an axis parallel to the axis of the rotor, the respective axes of the sections being located (a) on a pitch circle whose axis is coincident with the axis of the rotor and (b), considering the sections in succession, at progressively increasing angular distances from a datum line intersecting the axis of the rotor, as measured by the angle included between said datum line and a line radial to the rotor and passing through the axis of the section and the diameter of the portions of the rotor carrying the sections of the peripheral surface thereof and the radius of the pitch circle being such that the peripheries of said portions sweep closely past the interior surface of the mixing chamber as the rotor revolves, so causing the materials as they are forced along the chamber to be squeezed against and rolled around said interior surface thereof between the same and said peripheries.

The invention may take either of two general forms. According to one of these forms the portions of the rotor carrying the sections of the periphery thereof are disposed immediately adjacent one another along the rotor, whereby the latter has the form virtually of a body built up of a series of discs disposed face to face with their respective axes located relatively to the axis of the rotor in the manner specified above. According to the other of said forms the portions of the rotor carrying the sections of the periphery thereof are separated from one another axially of the rotor and interposed between them are worm conveyors for the materials in course of being admixed, said conveyors being coaxial with the rotor and preferably forming an integral part thereof.

A mixer in accordance with this invention is not only advantageous over the known mixers referred to by reason of the fact that it is operable in a continuous manner, and all of the operations involved in the use of the mixer being mechanically performed, the mixer can be operated without the need to employ skilled labour or, indeed, labour at all, since it can readily be left to operate without the oversight of an attendant, but is found to be highly efficient as regards the mixing action, especially with materials having a base of elastic rubber.

The means for forcing the materials to be admixed into, through and out of the mixing chamber may take any desired form. Conveniently, and according to a preferred form of the invention, the said means is constituted by a worm or worms operable on the principle of a screw conveyor.

According to one convenient and generally preferred arrangement, there is such a worm at both the inlet end of the chamber and also the outlet end thereof, the portion of the interior of the chamber disposed between the two worms constituting the interior proper of the chamber (by which is meant the part of the chamber interior wherein the bulk at least of the mixing of the materials takes place) and the two worms serving respectively to feed the materials into said interior proper and the second to eject them (in the mixed condition) from the machine, for example as a continuous shaped strip.

The mixer may be fed with materials to be mixed in a continuous manner. Alternatively it may be fed with said materials in an intermittent manner, as by means of a measuring device which delivers the materials in batches of predetermined fixed weight or volume, the said measuring device being operable automatically.

If desired, the wall of the mixing chamber may be jacketed for the conveyance of a heating or cooling medium for effecting a heating or cooling respectively of the materials undergoing mixing in the chamber. In a similar way the rotor within the chamber constituting the means by which the materials are mechanically admixed with one another as they are forced through the chamber, may be hollow or otherwise suitably cavitied for the conveyance of a heating or cooling medium.

The invention will now be further described with reference to the accompanying drawings, which illustrate, purely by way of example, two preferred embodiments of the invention.

Figure 2A:
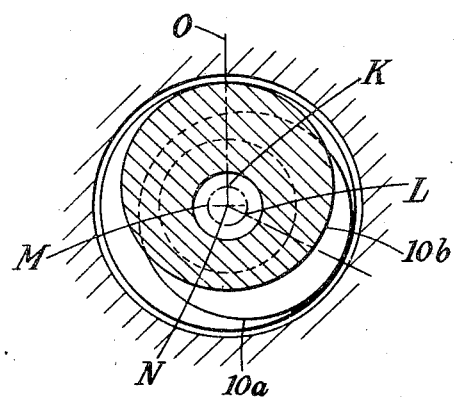

In the drawings:

Figure 1 is a longitudinal section through the mixer according to one of said embodiments; and Figure 2 is a similar section illustrating the other embodiment, while Figures 1a and 2a are respectively fragmentary cross-sectional views through Figures 1 and 2 on the section lines A—A and B—B thereof looking in the direction of the arrows.

Like reference numerals indicate like parts in the two figures.

Referring first to the embodiment of Figure 1, the mixer shown in this figure comprises a body 1, within which is a tubular space 2, extending through the body from end to end thereof.

Disposed within the space 2, coaxially thereof, is a rotatable structure, generally marked 3 and comprising three portions disposed axially adjacent to one another in the structure and forming together a unit rotatable as such in the space 2. One of these portions is marked 7a, another 7b and the third 7c.

As will be observed, the portions 7a and 7c are in the form of worms as hereinbefore referred to, operating within respectively the right hand end portion and the left hand end portion of the tubular space 2, which right hand end portion and left hand end portion constitute respectively an inlet and an outlet of a mixing chamber constituted, as regards its interior proper, by the central portion of the space 2, occupied by the centre portion 7b of the rotatable structure aforesaid.

It will also be observed that, vertically over the worm 7a, is a feeding hopper 6, by way of which the materials to be compounded (mixed) are fed into the inlet referred to of the mixing chamber, along which inlet the materials are then fed by the worm 7a into the chamber and, therefore, into the path of the centre portion 7b of the rotatable structure, which centre portion forms the rotor as aforesaid of the mixer.

The left hand worm 7c, occupying the outlet as referred to of the mixing chamber, forces the compounded materials along the outlet to the left hand end thereof, whereat is an annular nozzle surrounding the hub of the worm 7c, the arrangement being such, therefore, that the mixture of compounded materials is caused to issue from the outlet in the form of a continuous strip.

The rotor portion 7b of the rotatable structure 7a, 7b, 7c, is of the shape hereinbefore described, of a body built up of a series of discs, 7d, disposed face to face along the axis of the rotor, eccentrically with respect thereto, the respective axes C, D, E, etc. of the discs being disposed (a) on a pitch circle F whose centre G lies on the axis of the rotor and (b) at progressively increasing angular distances from a datum line H intersecting the axis of the rotor, as measured by the angle included between said datum line and a line radial to the rotor and passing through the axis of the disc.

The body 1 is formed with a jacket space 8 surrounding the mixing chamber, for the conveyance of a heating or cooling fluid as hereinbefore described, and the rotatable structure 7a, 7b, 7c, is similarly provided with an interior cavity 9 for the conveyance of such a medium.

The rotatable structure is suitably supported in the body 1 through the intermediary of bearings therein, of which one, marked 11, is shown.

The structure is driven by any suitable form of power means through the intermediary of transmission gears 4, 5.

Referring now to the mixer shown in Figure 2, the construction of this mixer is generally similar to that of the mixer of Figure 1, the essential difference being that, in the case of the mixer of Figure 2, the rotor has the alternative form hereinbefore described, according to which it consists of three discs 10a, 10b and 10c, spaced from one another axially of the rotor and disposed with their respective axes J, K, L, (a) on a pitch circle M the centre N of which lies on the axis of the rotor, and (b) at progressively increasing angular distances from a datum line O intersecting the axis of the rotor, as measured by the angle included between said datum line and a line radial to the rotor and passing through the axis of the disc, with the interposition between the discs 10a and 10b of a further worm, 12b, and similarly between the discs 10b and 10c of a further worm 12c, these worms operating in the manner hereinbefore set forth to feed the materials undergoing compounding along the mixing chamber from disc to disc therealong. The three discs 10a, 10b and 10c, are disposed at angular distances apart around the axis of the rotor, of 120°.

It will be appreciated that the invention is susceptible to considerable variation as regards constructional details; for example the number of discs composing the rotor, the axial length of these discs, their eccentricity and their angular positions around the axis of the rotor with respect to one another, may all be varied to suit the requirements of the compounding operation, which in turn will depend, as will be appreciated, upon the physical properties of the materials to be compounded and also upon the character of the composition to be obtained. All such variations are to be understood as within the scope of the invention as delineated in the following statement of claim.

What I claim as my invention and desire to secure by Letters Patent of the United States is:

1. A mixer for the ingredients of compositions having a base of elastic rubber or a like plastic, of the class designed for continuous operation and comprising a tubular mixing chamber of circular cross-section having an inlet at one end and an outlet at the other end, continuously operable means for forcing the materials to be mixed into the mixing chamber by way of the inlet thereof, along the chamber to the outlet thereof and out of the chamber by way of said outlet, and continuously operable means for mechanically admixing the materials with one another as they are forced through the chamber, wherein the last mentioned means is constituted by a rotor disposed coaxially with the mixing chamber and sub-divided as to its peripheral surface, axially of the rotor, into a number of sections each of which is a surface of revolution about an axis parallel to the axis of the rotor, the respective axes of the sections being located (a) on a pitch circle whose axis is coincident with the axis of the rotor and (b), considering the sections in succession, at progressively increasing angular distances from a datum line intersecting the axis of the rotor, as measured by the angle included between said datum line and a line radial to the rotor and passing through the axis of the section and the diameter of the portions of the rotor carrying the sections of the peripheral surface thereof and the radius of the pitch circle being such that the peripheries of said portions sweep closely past the interior surface of the mixing chamber as the rotor revolves, so causing the materials as they are forced along the chamber to be squeezed against and rolled around said interior surface thereof between the same and said peripheries.

2. A mixer as specified in claim 1, wherein the portions of the rotor carrying the sections of the periphery thereof are disposed immediately adjacent one another along the rotor.

3. A mixer as specified in claim 1, wherein the portions of the rotor carrying the sections of the periphery thereof are separated from one another axially of the rotor and interposed between them are worm conveyors for the materials in course of being admixed, said conveyors being coaxial with the rotor.

4. A mixer as specified in claim 1, wherein the portions of the rotor carrying the sections of the periphery thereof are separated from one another axially of the rotor and interposed between them are worm conveyors for the materials in course of being admixed, said conveyors being coaxial with the rotor and forming an integral part thereof.

5. A mixer as specified in claim 1, wherein the means for forcing the materials to be mixed into, along and out of the mixing chamber is constituted by a pair of worm conveyors disposed coaxially with the rotor, one at the inlet of the mixing chamber and the other at the outlet thereof.

6. A mixer as specified in claim 1, wherein the means for forcing the materials to be mixed into, along and out of the mixing chamber is constituted by a pair of worm conveyors disposed coaxially with the rotor, one at the inlet of the mixing chamber and the other at the outlet thereof, and forming an integral part thereof.

7. A mixer as specified in claim 1, wherein the portions of the rotor carrying the sections of the periphery thereof are disposed immediately adjacent one another along the rotor and the means for forcing the materials to be mixed into, along and out of the mixing chamber is constituted by a pair of orm conveyors disposed coaxially with the rotor, one at the inlet of the mixing chamber and the other at the outlet thereof, and forming an integral part thereof.

8. A mixer as specified in claim 1, wherein the portions of the rotor carrying the sections of the periphery thereof are separated from one another axially of the rotor and interposed between them are worm conveyors for the materials in course of being admixed, said conveyors being coaxial with the rotor and the means for forcing the materials to be mixed into, along and out of the mixing chamber is constituted by a pair of worm conveyors disposed coaxially with the rotor, one at the inlet of the mixing chamber and the other at the outlet thereof.

9. A mixer as specified in claim 1, wherein the rotor is cavitied for the conveyance of a fluid capable of exchanging heat through the wall of the rotor with the materials to be admixed in the mixing chamber.

VITTORIO ZONA.

REFERENCES CITED

The following references are of record in the file of this patent:

UNITED STATES PATENTS

| Number | Name | Date |
|---|---|---|
| 900,787 | Schreck, Sr. | Oct. 13, 1908 |
| 1,177,200 | Mashek | Mar. 28, 1916 |
| 1,914,459 | Reider et al. | June 20, 1933 |
| 2,092,932 | Thalman | Sept. 14, 1937 |